United States Patent
Shibata

(10) Patent No.: US 10,427,460 B2
(45) Date of Patent: Oct. 1, 2019

(54) TIRE LAMINATE, INNER LINER MATERIAL FOR TIRE, AND PNEUMATIC TIRE

(71) Applicant: The Yokohama Rubber Co., Ltd., Tokyo (JP)

(72) Inventor: Hirokazu Shibata, Hiratsuka (JP)

(73) Assignee: THE YOKOHAMA RUBBER CO., LTD., Tokyo (JP)

( * ) Notice: Subject to any disclaimer, the term of this patent is extended or adjusted under 35 U.S.C. 154(b) by 0 days.

(21) Appl. No.: 15/513,712

(22) PCT Filed: Sep. 25, 2015

(86) PCT No.: PCT/JP2015/077215
§ 371 (c)(1),
(2) Date: Mar. 23, 2017

(87) PCT Pub. No.: WO2016/047792
PCT Pub. Date: Mar. 31, 2016

(65) Prior Publication Data
US 2017/0305194 A1 Oct. 26, 2017

(30) Foreign Application Priority Data
Sep. 25, 2014 (JP) .................... 2014-195713

(51) Int. Cl.
| B32B 27/36 | (2006.01) |
| B32B 23/04 | (2006.01) |
| C08G 69/36 | (2006.01) |
| C08L 61/14 | (2006.01) |
| B60C 5/14 | (2006.01) |
| B32B 25/08 | (2006.01) |

(Continued)

(52) U.S. Cl.
CPC .............. *B60C 5/14* (2013.01); *B32B 7/04* (2013.01); *B32B 23/046* (2013.01); *B32B 25/08* (2013.01); *B32B 25/12* (2013.01); *B32B 25/14* (2013.01); *B32B 25/16* (2013.01); *B32B 25/18* (2013.01); *B32B 25/20* (2013.01); *B32B 27/28* (2013.01); *B32B 27/281* (2013.01); *B32B 27/30* (2013.01); *B32B 27/302* (2013.01); *B32B 27/304* (2013.01); *B32B 27/306* (2013.01); *B32B 27/308* (2013.01); *B32B 27/32* (2013.01); *B32B 27/34* (2013.01); *B32B 27/36* (2013.01); *B60C 1/0008* (2013.01); *C08K 5/07* (2013.01); *C08K 5/3477* (2013.01); *C08L 7/00* (2013.01); *C08L 9/06* (2013.01); *C08L 25/16* (2013.01); *C08L 77/06* (2013.01); *C08L 101/00* (2013.01); *B32B 2250/02* (2013.01); *B32B 2250/24* (2013.01); *B32B 2270/00* (2013.01); *B32B 2307/748* (2013.01); *B32B 2605/00* (2013.01); *B60C 2005/145* (2013.01); *C08G 69/36* (2013.01); *C08L 61/14* (2013.01); *C08L 2205/025* (2013.01); *C08L 2205/03* (2013.01)

(58) Field of Classification Search
CPC ..................................................... B60C 1/0008
See application file for complete search history.

(56) References Cited

U.S. PATENT DOCUMENTS
| 2013/0078477 A1 | 3/2013 | Shibata |
| 2014/0349127 A1 | 11/2014 | Minamide et al. |
| 2016/0185156 A1 | 6/2016 | Shibata |

FOREIGN PATENT DOCUMENTS
| JP | 08-269241 A | 10/1996 |
| JP | 2010-269481 A | 12/2010 |

(Continued)

OTHER PUBLICATIONS

Kawamo, English machine translation of JP 8-269241 A (1996).*

Primary Examiner — Peter F Godenschwager
(74) Attorney, Agent, or Firm — Polsinelli PC

(57) ABSTRACT

This tire laminate comprises a film of a thermoplastic resin composition and a layer of a rubber composition, and is characterized in that the rubber composition contains at least one type of rubber component, a condensate of formaldehyde and the compound represented by formula (1) ($R^1$ to $R^5$ in the formula are defined in the specification), at least one type of methylene donor and a vulcanizing agent, and in that there are 0.5-20 parts by mass of the condensate per total 100 parts by mass of the at least one type of rubber component, there are 0.25-200 parts by mass of the at least one type of methylene donor per total 100 parts by mass of the at least one type of rubber component, the mass ratio of the at least one type of methylene donor and the condensate is 0.5:1-10:1, and, based on the total amount of the at least one type of rubber component, the at least one type of rubber component includes 10-80 mass % of rubber in which the vinyl content in side chains of aliphatic unsaturated hydrocarbons exceeds 11 mol %. This tire laminate exhibits improved adhesive strength between the film of the thermoplastic resin composition and the layer of the rubber composition.

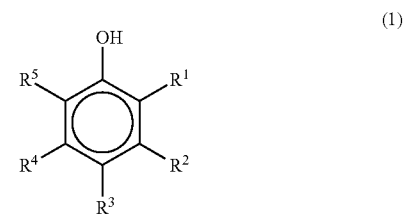

(1)

20 Claims, No Drawings

(51) Int. Cl.
*B32B 27/28* (2006.01)
*B32B 27/30* (2006.01)
*B32B 27/34* (2006.01)
*C08K 5/07* (2006.01)
*C08K 5/3477* (2006.01)
*C08L 101/00* (2006.01)
*B60C 1/00* (2006.01)
*C08L 7/00* (2006.01)
*C08L 9/06* (2006.01)
*C08L 25/16* (2006.01)
*C08L 77/06* (2006.01)
*B32B 7/04* (2019.01)
*B32B 25/12* (2006.01)
*B32B 25/14* (2006.01)
*B32B 25/16* (2006.01)
*B32B 25/18* (2006.01)
*B32B 25/20* (2006.01)
*B32B 27/32* (2006.01)

(56) References Cited

FOREIGN PATENT DOCUMENTS

| | | |
|---|---|---|
| JP | 2012-177071 A | 9/2012 |
| WO | WO-2013/105392 A1 | 7/2013 |
| WO | WO-2014/097994 A1 | 6/2014 |

* cited by examiner

TIRE LAMINATE, INNER LINER MATERIAL FOR TIRE, AND PNEUMATIC TIRE

CROSS REFERENCE TO RELATED APPLICATIONS

This application is a National Phase filing under 35 U.S.C. § 371 of PCT/JP2015/077215 filed on Sep. 25, 2015; and this application claims priority to Application No. 2014-195713 filed in Japan on Sep. 25, 2014, under 35 U.S.C. § 119. The entire contents of each application are hereby incorporated by reference.

TECHNICAL FIELD

The present invention relates to a laminate of a film of a thermoplastic resin composition and a layer of a rubber composition, an inner liner material for a tire consisting of the laminate, and a pneumatic tire comprising the inner liner material. More specifically, the present invention relates to a laminate having improved adhesion strength between a film of a thermoplastic resin composition and a layer of a rubber composition and further having excellent adhesion properties to other rubbers that constitute a tire, an inner liner material for a tire consisting of the laminate, and a pneumatic tire comprising the inner liner material.

BACKGROUND ART

The present inventor previously proposed increasing the adhesion strength at the interface between a film of a thermoplastic resin or thermoplastic elastomer composition and a layer of a rubber composition in a laminate of the film of the thermoplastic resin or thermoplastic elastomer composition and the layer of the rubber composition by blending the rubber composition with a condensate having a phenolic structure and a basic component which generates formaldehyde, at a specific blending ratio, and adjusting the blending of sulfur and a vulcanization accelerator (Patent Document 1).

CITATION LIST

Patent Document

Patent Document 1: Japanese Unexamined Patent Publication No. 2012-177071

SUMMARY OF INVENTION

Technical Problem

The present inventor has made an intensive study with the aim of further improving the adhesion strength between a film of a thermoplastic resin composition and a layer of a rubber composition and to further improve the adhesion properties to other rubber members that constitute a tire, and as a result has found that such an aim can be achieved by inclusion of a specific amount of a rubber having a vinyl content in aliphatic unsaturated hydrocarbon side chains of more than 11 mol % in at least one rubber component which constitutes the rubber composition, and consequently have completed the present invention. In a pneumatic tire comprising as an inner liner material a laminate of a film of a thermoplastic resin composition and a layer of a rubber composition, the present invention enables an improvement in the adhesion strength between the film of the thermoplastic resin composition and another rubber member which constitutes the tire.

Solution to Problem

According to the present invention, a laminate for a tire comprising a film of a thermoplastic resin composition and a layer of a rubber composition laminated on the film is provided, wherein the rubber composition comprises (a) at least one rubber component, (b) a condensate of a compound represented by the following formula (1):

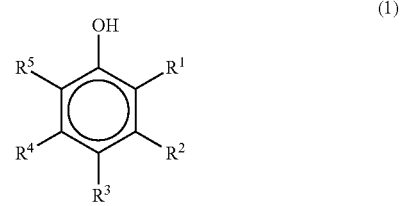

wherein $R^1$, $R^2$, $R^3$, $R^4$ and $R^5$ are independently selected from hydrogen, hydroxyl group, alkyl groups having 1 to 8 carbon atoms, —O—$R^6$ (wherein $R^6$ is an alkyl group having 1 to 8 carbon atoms), and —$R^7$—O—$R^8$ (wherein $R^7$ is an alkylene group having 1 to 7 carbon atoms, and $R^8$ is an alkyl group having 1 to 7 carbon atoms, with the proviso that the sum of the carbon atoms of $R^7$ and $R^8$ is 2 to 8), with formaldehyde, (c) at least one methylene donor, and (d) a vulcanizing agent, wherein condensate (b) is present in an amount of 0.5 to 20 parts by weight per 100 parts by weight of the total amount of at least one rubber component (a), at least one methylene donor (c) is present in an amount of 0.25 to 200 parts by weight per 100 parts by weight of the total amount of at least one rubber component (a), the weight ratio of at least one methylene donor (c) and condensate (b) is 0.5:1 to 10:1, and at least one rubber component (a) comprises a rubber having a vinyl content in aliphatic unsaturated hydrocarbon side chains of more than 11 mol % in an amount of 10% by weight to 80% by weight based on the total amount of at least one rubber component (a).

According to the present invention, an inner liner material for a pneumatic tire, consisting of the laminate described above is further provided.

According to the present invention, a pneumatic tire comprising an inner liner material for a pneumatic tire consisting of the laminate described above is further provided.

More specifically, the present invention includes the following embodiments [1] to [7].

[1] A laminate for a tire comprising a film of a thermoplastic resin composition and a layer of a rubber composition laminated on the film, wherein the rubber composition comprises (a) at least one rubber component,
(b) a condensate of a compound represented by the following formula (1):

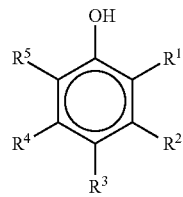

(1)

wherein $R^1$, $R^2$, $R^3$, $R^4$ and $R^5$ are independently selected from hydrogen, hydroxyl group, alkyl groups having 1 to 8 carbon atoms, —O—$R^6$ (wherein $R^6$ is an alkyl group having 1 to 8 carbon atoms), and —$R^7$—O—$R^8$ (wherein $R^7$ is an alkylene group having 1 to 7 carbon atoms, and $R^8$ is an alkyl group having 1 to 7 carbon atoms, with the proviso that the sum of the carbon atoms of $R^7$ and $R^8$ is 2 to 8), with formaldehyde,
(c) at least one methylene donor, and
(d) a vulcanizing agent,
wherein condensate (b) is present in an amount of 0.5 to 20 parts by weight per 100 parts by weight of the total amount of at least one rubber component (a),
at least one methylene donor (c) is present in an amount of 0.25 to 200 parts by weight per 100 parts by weight of the total amount of at least one rubber component (a),
the weight ratio of at least one methylene donor (c) and condensate (b) is 0.5:1 to 10:1, and
at least one rubber component (a) comprises a rubber having a vinyl content in aliphatic unsaturated hydrocarbon side chains of more than 11 mol % in an amount of 10% by weight to 80% by weight based on the total amount of at least one rubber component (a).

[2] The laminate according to Embodiment [1] above, wherein the aliphatic unsaturated hydrocarbon side chains are vinyl groups.

[3] The laminate according to Embodiment [1] or [2] above, wherein the thermoplastic resin composition comprises at least one thermoplastic resin selected from the group consisting of poly(vinyl alcohol), ethylene-vinyl alcohol copolymer, nylon 6, nylon 66, nylon 11, nylon 12, nylon 610, nylon 612, nylon 6/66, nylon MXD6, and nylon 6T.

[4] The laminate according to Embodiment [1] or [2] above, wherein the thermoplastic resin composition comprises at least one thermoplastic resin and at least one elastomer dispersed in the thermoplastic resin, wherein the at least one thermoplastic resin is selected from the group consisting of polyvinyl alcohol, ethylene-vinyl alcohol copolymer, nylon 6, nylon 66, nylon 11, nylon 12, nylon 610, nylon 612, nylon 6/66, nylon MXD6, and nylon 6T; and the at least one elastomer is selected from the group consisting of brominated isobutylene-p-methylstyrene copolymer, maleic anhydride-modified ethylene-α-olefin copolymers, ethylene-glycidyl methacrylate copolymer, and maleic anhydride-modified ethylene-ethyl acrylate copolymer.

[5] The laminate according to any one of Embodiments [1] to [4] above, wherein the at least one methylene donor is selected from the group consisting of modified etherified methylolmelamines, paraformaldehyde, hexamethylenetetramine, pentamethylenetetramine, and hexamethoxymethylmelamine.

[6] An inner liner material for a pneumatic tire, consisting of the laminate according to any one of Embodiments [1] to [5] above.

[7] A pneumatic tire comprising the inner liner material for a pneumatic tire consisting of the laminate according to any one of Embodiments [1] to [5] above.

DESCRIPTION OF EMBODIMENTS

Examples of thermoplastic resins that can constitute the thermoplastic resin composition for the film of the thermoplastic resin composition in the laminate of the present invention include polyamide resins, polyester resins, polynitrile resins, polymethacrylate resins, polyvinyl resin, cellulose resins, fluoro resins, imide resins, polystyrene resins, polyolefin resins, etc. The thermoplastic resin composition may include at least one thermoplastic resin.

Examples of polyamide resins include nylon 6 (N6), nylon 66 (N66), nylon 46 (N46), nylon 11 (N11), nylon 12 (N12), nylon 610 (N610), nylon 612 (N612), nylon 6/66 (N6/66), nylon 6/66/12 (N6/66/12), nylon 6/66/610 (N6/66/610), nylon MXD6 (MXD6), nylon 6T, nylon 6/6T, nylon 9T, nylon 66/PP copolymers, nylon 66/PPS copolymers, etc. Examples of polyester resins include aromatic polyesters, such as poly(butylene terephthalate) (PBT), poly(ethylene terephthalate) (PET), poly(ethylene isophthalate) (PEI), PET/PEI copolymers, polyarylate (PAR), poly(butylene naphthalate) (PBN), liquid crystal polyesters, polyoxyalkylene diimidic acid/polybutyrate-terephthalate copolymers, etc. Examples of polynitrile resins include polyacrylonitrile (PAN), polymethacrylonitrile, acrylonitrile/styrene copolymers (AS), methacrylonitrile/styrene copolymers, methacrylonitrile/styrene/butadiene copolymers, etc. Examples of polymethacrylate resins include poly(methyl methacrylate) (PMMA), poly(ethyl methacrylate), etc. Examples of polyvinyl resins include poly(vinyl acetate) (PVAc), poly(vinyl alcohol) (PVA), ethylene-vinyl alcohol copolymers (EVOH), poly(vinylidene chloride) (PVDC), poly(vinyl chloride) (PVC), vinyl chloride/vinylidene chloride copolymers, vinylidene chloride/methyl acrylate copolymers, etc. Examples of cellulose resins include cellulose acetate, cellulose acetate butyrate, etc. Examples of fluoro resins include poly(vinylidene fluoride) (PVDF), poly(vinyl fluoride) (PVF), polychlorofluoroethylene (PCTFE), tetrafluoroethylene/ethylene copolymers (ETFE), etc. Examples of imide resins include aromatic polyimides (PI), etc. Examples of polystyrene resins include polystyrene (PS), etc. Examples of polyolefin resins include polyethylene (PE), polypropylene (PP), etc. Among them, preferred are poly(vinyl alcohol), ethylene-vinyl alcohol copolymers, nylon 6, nylon 66, nylon 11, nylon 12, nylon 610, nylon 612, nylon 6/66, nylon MXD6, and nylon 6T, in view of satisfying both fatigue resistance and air barrier properties.

The thermoplastic resin composition may further comprise one or more 3 elastomers. When the thermoplastic resin composition further comprises one or more elastomers, the thermoplastic resin composition is in the form of a thermoplastic elastomer composition in which one or more elastomers are present in a state of being dispersed in one or more thermoplastic resins. In a thermoplastic elastomer composition, the thermoplastic resin(s) constitute a matrix phase (or a continuous phase), and the elastomer(s) constitute a dispersed phase.

Examples of the elastomer(s) which may be included in the thermoplastic resin composition include diene rubbers and hydrogenated products thereof, olefin rubbers, halogen-containing rubbers, silicone rubbers, sulfur-containing rubbers, fluoro rubbers, etc. Examples of diene rubbers and hydrogenated products thereof include natural rubber (NR), isoprene rubbers (IR), epoxidized natural rubbers, styrene-butadiene rubbers (SBR), butadiene rubbers (BR) (high-cis BR and low-cis BR), acrylonitrile butadiene rubbers (NBR), hydrogenated NBR, hydrogenated SBR, etc. Examples of olefin rubbers include ethylene propylene rubbers (EPM), ethylene propylene diene rubbers (EPDM), maleic acid-modified ethylene propylene rubbers (M-EPM), maleic anhydride-modified ethylene-α-olefin copolymers, ethylene-glycidyl methacrylate copolymers, maleic anhydride-modified ethylene-ethyl acrylate copolymers (modified EEA), butyl rubbers (IIR), copolymers of isobutylene and an aromatic vinyl or diene monomer, acrylic rubbers (ACM), ionomers, etc. Examples of halogen-containing rubbers include halogenated butyl rubbers such as brominated butyl rubbers (Br-IIR) and chlorinated butyl rubber (Cl-IIR), brominated isobutylene-p-methyl styrene copolymer (BIMS), halogenated isobutylene-isoprene copolymer rubbers, chloroprene rubbers (CR), hydrin rubbers (CHR), chlorosulfonated polyethylenes (CSM), chlorinated polyethylenes (CM), maleic acid-modified chlorinated polyethylenes (M-CM), etc. Examples of silicone rubbers include methyl vinyl silicone rubber, dimethyl silicone rubber, methyl phenyl vinyl silicone rubber, etc. Examples of sulfur-containing rubbers include polysulfide rubbers, etc. Examples of fluoro rubbers include vinylidene fluoride rubbers, fluorine-containing vinyl ether rubbers, tetrafluoroethylene-propylene rubbers, fluorine-containing silicone rubbers, fluorine-containing phosphazene rubbers, etc. Among them, brominated isobutylene-p-methylstyrene copolymers, maleic anhydride-modified ethylene-α-olefin copolymers, ethylene-glycidyl methacrylate copolymers, and maleic anhydride-modified ethylene-ethyl acrylate copolymers are preferred in view of air barrier properties.

Combinations of the elastomer and the thermoplastic resin that can constitute the thermoplastic resin composition in the laminate of the present invention, include, but not limited to, a halogenated butyl rubber and a polyamide resin, a brominated isobutylene-p-methylstyrene copolymer rubber and a polyamide resin, a butadiene rubber and a polystyrene resin, an isoprene rubber and a polystyrene resin, a hydrogenated butadiene rubber and a polystyrene resin, an ethylene propylene rubber and a polyolefin resin, an ethylene propylene diene rubber and a polyolefin resin, an amorphous butadiene rubber and a syndiotactic poly(1,2-polybutadiene), an amorphous isoprene rubber and trans-poly(1,4-isoprene), a fluoro rubber and a fluoro resin, etc., and a combination of a butyl rubber and a polyamide resin superior in air barrier properties is preferred, and among others combinations of a brominated isobutylene-p-methylstyrene copolymer rubber, which is a modified butyl rubber, and nylon 6/66, nylon 6 or a blend resin of nylon 6/66 and nylon 6 are especially preferred in view of satisfying both fatigue resistance and air barrier properties.

The thermoplastic elastomer composition can be prepared by melt-kneading at least one thermoplastic resin and at least one elastomer with, for example, a twin-screw kneading extruder, etc., to disperse the elastomer as a dispersed phase into the thermoplastic resin which forms a matrix phase. The weight ratio of the thermoplastic resin to the elastomer is preferably, but not limited to, from 10/90 to 90/10, and more preferably from 15/85 to 90/10.

In order to improve processability, dispersibility, heat resistance, oxidation resistance, etc., the thermoplastic resin composition may contain compounding ingredients that are generally compounded into a resin composition, such as a filler, a reinforcing agent, a processing aid, a stabilizer, and an antioxidant, to the extent that the effects of the present invention are not impaired. Although it is preferable not to add a plasticizer in view of air barrier properties and heat resistance, it may be added to the extent that the effects of the present invention are not impaired. When the thermoplastic resin composition comprises an elastomer, compounding ingredients that are generally compounded into a rubber composition, such as carbon black, silica, and the other reinforcing agents (fillers), softening agents, age resisters, processing aids, etc., may be compounded into the elastomer, to the extent that the effects of the present invention are not impaired.

The rubber composition which constitutes the layer of the rubber composition comprises:
(a) at least one rubber component,
(b) a condensate of a compound represented by the following formula (1):

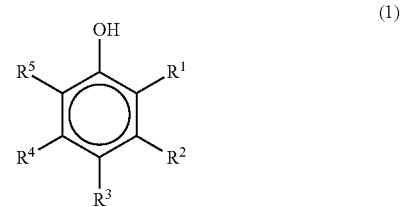

wherein $R^1$, $R^2$, $R^3$, $R^4$ and $R^5$ are independently selected from hydrogen, hydroxyl group, alkyl groups having 1 to 8 carbon atoms, —O—$R^6$ (wherein $R^6$ is an alkyl group having 1 to 8 carbon atoms), and —$R^7$—O—$R^8$ (wherein $R^7$ is an alkylene group having 1 to 7 carbon atoms, and $R^8$ is an alkyl group having 1 to 7 carbon atoms, with the proviso that the sum of the carbon atoms of $R^7$ and $R^8$ is 2 to 8), with formaldehyde,
(c) at least one methylene donor, and
(d) a vulcanizing agent,
wherein condensate (b) is present in an amount of 0.5 to 20 parts by weight per 100 parts by weight of the total amount of at least one rubber component (a),
at least one methylene donor (c) is present in an amount of 0.25 to 200 parts by weight per 100 parts by weight of the total amount of at least one rubber component (a),
the weight ratio of at least one methylene donor (c) and condensate (b) is 0.5:1 to 10:1, and
at least one rubber component (a) comprises a rubber having a vinyl content in aliphatic unsaturated hydrocarbon side chains of more than 11 mol % in an amount of 10% by weight to 80% by weight based on the total amount of at least one rubber component (a).

Examples of the rubber component (a) include diene rubbers and hydrogenated products thereof, olefin rubbers, halogen-containing rubbers, silicone rubbers, sulfur-containing rubbers, fluoro rubbers, etc. Examples of diene rubbers and hydrogenated products thereof include natural rubber (NR), isoprene rubbers (IR), epoxidized natural rubbers, styrene-butadiene rubbers (SBR), butadiene rubbers (BR) (high-cis BR and low-cis BR), acrylonitrile butadiene rubbers (NBR), hydrogenated NBR, hydrogenated SBR, etc. Examples of olefin rubbers include ethylene propylene rubbers (EPM), ethylene propylene diene rubbers (EPDM), maleic acid-modified ethylene propylene rubbers (M-EPM), maleic anhydride-modified ethylene-α-olefin copolymers, ethylene-glycidyl methacrylate copolymers, maleic anhydride-modified ethylene-ethyl acrylate copolymers (modified EEA), butyl rubbers (IIR), copolymers of isobutylene and an aromatic vinyl or diene monomer, acrylic rubbers (ACM), ionomers, etc. Examples of halogen-containing rubbers include halogenated butyl rubbers such as brominated butyl rubbers (Br-IIR) and chlorinated butyl rubbers (Cl-IIR), brominated isobutylene-p-methyl styrene copolymers (BIMS), halogenated isobutylene-isoprene copolymer rubbers, chloroprene rubbers (CR), hydrin rubbers (CHR), chlorosulfonated polyethylenes (CSM), chlorinated polyethylenes (CM), maleic acid-modified chlorinated polyethylenes (M-CM), etc. Examples of silicone rubbers include methyl vinyl silicone rubber, dimethyl silicone rubber, methyl phenyl vinyl silicone rubber, etc. Examples of sulfur-containing rubbers include polysulfide rubbers, etc. Examples of fluoro rubbers include vinylidene fluoride rubbers, fluorine-containing vinyl ether rubbers, tetrafluoroethylene-propylene rubbers, fluorine-containing silicone rubbers, fluorine-containing phosphazene rubbers, etc. Among them, diene rubbers, olefin rubbers and halogen-containing rubbers are preferred, and more preferred are natural rubber, styrene-butadiene rubbers, butadiene rubbers, brominated butyl rubbers, ethylene-propylene-diene rubbers, in view of properties of co-crosslinking with an adjacent rubber material.

At least one rubber component (a) preferably comprises a diene rubber. Examples of the diene rubber include natural rubber (NR), isoprene rubbers (IR), styrene-butadiene rubbers (SBR), butadiene rubbers (BR), acrylonitrile butadiene rubbers (NBR), etc. Among them, more preferred are natural rubber, styrene-butadiene rubbers, butadiene rubbers, isoprene rubbers and mixtures thereof, in view of properties of co-crosslinking with an adjacent rubber material. The proportion of the diene rubber within the at least one rubber component which constitutes the rubber composition is preferably 50% by weight or more, and more preferably 70% by weight or more, and all of the rubber components are more preferably a diene rubber.

In the present invention, at least one rubber component (a) comprises a rubber having a vinyl content in aliphatic unsaturated hydrocarbon side chains of more than 11 mol % in an amount of 10% by weight to 80% by weight based on the total amount of at least one rubber component (a). If the amount of the rubber having a vinyl content in aliphatic unsaturated hydrocarbon side chains of more than 11 mol % exceeds the upper limit of the above range, burning is liable to be brought about, thereby reducing processability, and if the amount is less than the lower limit of the above range, the peel strength is not increased. The aliphatic unsaturated hydrocarbon side chains are preferably 1,2-vinyl groups. The rubber having a vinyl content in aliphatic unsaturated hydrocarbon side chains of more than 11 mol % preferably has a 1,2-vinyl group content of 30 to 80%. Since a double bond present at a terminal or side chain has a higher reactivity than the double bond present in the main chain, the adhesive strength at the adhesive interface can be improved. Examples of the rubber having aliphatic unsaturated hydrocarbon side chains include styrene-butadiene rubbers and butadiene rubbers. A styrene-butadiene rubber having a 1,2-vinyl group content within the above range can be produced by, for example, an anionic polymerization with n-butyl lithium. A styrene-butadiene rubber having a 1,2-vinyl group content within the above range may be a commercial product, and examples of the commercial product include Nipol™ NS616 available from Zeon Corporation.

A preferred example of the compound represented by formula (1) is one in which at least one of $R^1$, $R^2$, $R^3$, $R^4$ and $R^5$ is an alkyl group having 1 to 8 carbon atoms and the remainder are hydrogen. A specific preferred example of the compound represented by formula (1) is cresol. Another preferred example of the compound represented by formula (1) is one in which at least one of $R^1$, $R^2$, $R^3$, $R^4$ and $R^5$ is hydroxyl group and the remainder are hydrogen or an alkyl group having 1 to 8 carbon atoms. Another specific preferred example of the compound represented by formula (1) is resorcin.

Examples of the condensate of the compound represented by formula (1) with formaldehyde include cresol-formaldehyde condensate, resorcin-formaldehyde condensate, etc. These condensates may be modified to the extent that the effects of the present invention are not impaired. For example, a resorcin-formaldehyde condensate modified with an epoxy compound may also be used in the present invention. Such condensates are commercially available, and the commercial products can be used in the present invention.

A condensate of the compound represented by formula (1) with formaldehyde is preferably a compound represented by formula (2) or (3):

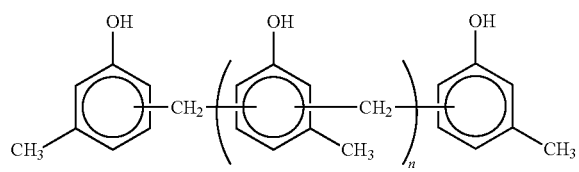

(2)

wherein n is an integer of 1 to 20, preferably an integer of 1 to 10, and more preferably an integer of 1 to 5;

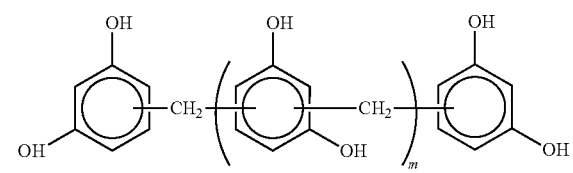

(3)

wherein m is an integer of 1 to 20, preferably an integer of 1 to 10, and more preferably an integer of 1 to 3.

The compounding amount of the condensate of the compound represented by formula (1) with formaldehyde (hereinafter also referred to simply as "condensate") is 0.5 to 20 parts by weight, and preferably 1 to 10 parts by weight, per 100 parts by weight of the rubber component. If the compounding amount of the condensate is too small, the heat amount and time required to achieve a good adhesion are increased, thereby impairing the vulcanization efficiency. Conversely, if the compounding amount of the condensate is too much, the resulting rubber composition has a decreased elongation after vulcanization, and therefore is more likely to be broken.

The "methylene donor" refers to a basic compound, which generates formaldehyde upon heating, etc., and includes, for example, hexamethylenetetramine, pentamethylenetetramine, hexamethylenediamine, methylolmelamine, etherified methylolmelamine, modified etherified methylolmelamines, esterified methylolmelamine, hexamethoxymethylolmelamine, hexamethylolmelamine, hexakis(ethoxymethyl)melamine, hexakis(methoxymethyl)melamine, N,N',N''-trimethyl-N,N',N''-trimethylolmelamine, N,N',N''-trimethylolmelamine, N-methylolmelamine, N,N'-bis(methoxymethyl)melamine, N,N',N''-tributyl-N,N',N''-trimethylolmelamine, paraformaldehyde, etc. Among them, modified etherified methylolmelamines are preferred in view of the formaldehyde-releasing temperature.

The total amount of the at least one methylene donor is 0.25 to 200 parts by weight, preferably 0.5 to 80 parts by weight, and more preferably 1 to 40 parts by weight, per 100 parts by weight of the rubber component. If the compounding amount of the methylene donor is too small, the donor is consumed by the resin reaction in the rubber composition system and a reaction in terms of an interface reaction ceases to proceed, thereby impairing the adhesion. Conversely, if the compounding amount of the methylene donor is too much, the reaction in the rubber composition system may be accelerated too much, or a crosslinking reaction in the resin system to be adhered may be caused, thereby impairing the adhesion.

The weight ratio of the at least one methylene donor and the condensate is from 0.5:1 to 10:1, preferably from 1:1 to 4:1, and more preferably from 1:1 to 3:1. If the proportion of the methylene donor to the condensate is too low, the donor is consumed by the resin reaction in the rubber composition system and a reaction in terms of an interface reaction ceases to proceed, thereby impairing the adhesion. Conversely, if the ratio is too high, the reaction in the rubber composition system may be accelerated too much, or a crosslinking reaction in the resin system to be adhered may be caused, thereby impairing the adhesion.

Examples of the vulcanizing agent include inorganic vulcanizing agents and organic vulcanizing agents. Examples of inorganic vulcanizing agents include sulfur, sulfur monochloride, selenium, tellurium, zinc oxide, magnesium oxide, lead monoxide, etc., and examples of organic vulcanizing agents include sulfur-containing organic compounds, salts of dithiocarbamic acid, oximes, tetrachloro-p-benzoquinone, dinitroso compounds, modified phenolic resins, polyamines, organic peroxides, etc. Among them, sulfur, organic peroxides such as 1,3-bis-(t-butylperoxyisopropyl)-benzene, modified phenolic resins such as brominated alkylphenol-formaldehyde condensates, zinc oxide, and sulfur-containing organic compounds are preferred.

Examples of the vulcanization accelerator include those of aldehyde-ammonia type, aldehyde-amine type, thiourea type, guanidine type, thiazole type, sulfenamide type, thiuram type, dithiocarbamic acid salt type, and xanthogenic acid salt type, and preferred are thiazole type, sulfenamide type, and thiuram type. Thiazole type vulcanization accelerators are compounds having thiazole structure, and include, for example, di-2-benzothiazolyldisulfide, mercaptobenzothiazole, benzothiazyldisulfide, mercaptobenzothiazole zinc salt, (dinitrophenyl)mercaptobenzothiazole, and (N,N-diethylthiocarbamoylthio)benzothiazole, etc., and among them, di-2-benzothiazolyldisulfide is preferred. Sulfenamide type vulcanization accelerators are compounds having sulfenamide structure, and include, for example, N-cyclohexylbenzothiazole sulfenamide, N-t-butylbenzothiazole sulfenamide, N-oxydiethylenebenzothiazole sulfenamide, N,N-dicyclohexylbenzothiazole sulfenamide, (morpholinodithio)benzothiazole, etc., and among them, N-t-butyl-2-benzothiazole sulfenamide is preferred. Thiuram type vulcanization accelerators are compound having thiuram structure, and include, for example, tetrakis(2-ethylhexyl)thiuram disulfide, tetramethylthiuram disulfide, tetramethylthiuram monosulfide, tetraethylthiuram disulfide, tetrabutylthiuram disulfide, dipentamethylenethiuram hexasulfide, etc., and among them, tetrakis(2-ethylhexyl) thiuram disulfide is preferred.

The laminate according to the present invention can be produced by overlaying the rubber composition on a film of a thermoplastic resin. More particularly, but without intention to limit thereto, it can be produced in the following manner. Firstly, a thermoplastic resin composition is formed into a film by a forming machine, such as a blown film extrusion device, a T-die extruder, etc., to produce a film of the thermoplastic resin composition. Next, the rubber composition is extruded by a T-die extruder, etc., onto the film and simultaneously laminated with the film to produce a laminate.

A pneumatic tire can be produced by a conventional process using a laminate according to the present invention. For example, a laminate according to the present invention is placed as an inner liner material on a tire molding drum so that the thermoplastic resin composition film side faces toward the tire molding drum, and members that are usually used for the production of a tire, such as carcass layer, belt layer, tread layer, etc., each comprising a unvulcanized rubber, are sequentially overlaid in this order onto the laminate. After molding, the drum is pulled out to obtain a green tire, and subsequently, the green tire is heated and vulcanized in accordance with a conventional method to produce a pneumatic tire.

EXAMPLES (1) Production of Film

Raw materials were compounded at the compounding ratio shown in Table 1 to prepare a thermoplastic resin composition, and the thermoplastic resin composition was formed into a film having a thickness of 0.2 mm with a blown film extrusion apparatus. The resulting film is designated as Film A.

TABLE 1

| Formulation of Film A (parts by weight) | |
|---|---|
| BIMS | 100 |
| Zinc oxide | 0.5 |
| Stearic acid | 0.2 |
| Zinc stearate | 1 |
| Thermoplastic resin | 100 |
| Modified EEA | 10 |
| Plasticizer | 20 |
| Total | 231.7 |

Raw Materials of Film A:

BIMS: a brominated isobutylene-p-methylstyrene copolymer (Exxpro™ 3035 from ExxonMobil Chemical Company)

Zinc Oxide: Zinc white No. 3 from Seido Chemical Industry Co., Ltd.

Stearic acid: Stearic acid for industrial use from Chiba Fatty Acid Co., Ltd.

Zinc stearate: Zinc stearate from NOF Corporation.

Thermoplastic resin: Nylon 6/66 (UBE Nylon™ 5033B from Ube Industries, Ltd.)

Modified EEA: a maleic anhydride-modified ethylene-ethyl acrylate copolymer (Rilsan BESNOTL from Arkea Co.)

Plasticizer: BM-4 from Daihachi Chemical Industry Co., Ltd.

(2) Preparation of Rubber Composition

The following raw materials were compounded at the compounding ratios shown in Table 2 with a Banbury mixer to prepare rubber compositions of Comparative Examples 1 to 3 and Examples 1 to 4.

Raw Materials of the Rubber Compositions:

SBR1: Nipol™ 1502 (1,2-vinyl content: 11%) from Zeon Corporation

SBR2: TUFDENE™ 1000 (1,2-vinyl content: 7%) from Asahi Kasei Chemicals Corporation SBR3: TUFDENE™ 2000R (1,2-vinyl content: 7%) from Asahi Kasei Chemicals Corporation SBR4: Nipol™ NS616 (1,2-vinyl content:50%) from Zeon Corporation

NR: SIR-20

Carbon black: Seast V from Tokai Carbon Co., Ltd.

Stearic acid: stearic acid for industrial use from Chiba Fatty Acid Co., Ltd.

Aromatic oil: Desolex No. 3 from Showa Shell Sekiyu K.K.

Zinc oxide: Zinc white No. 3 by Seido Chemical Industry Co., Ltd.

Condensate: a modified resorcin-formaldehyde condensate (Sumikanol 620 from Taoka Chemical Co., Ltd.)

Methylene donor: a modified etherified methylolmelamine resin (Sumikanol 507AP from Taoka Chemical Co., Ltd.)

Sulfur: 5% oil extended sulfur from Karuizawa Refinery Inc.

Vulcanization accelerator: di-2-benzothiazolyl disulfide (Nocceler DM from Ouchi-Shinko Chemical Industrial Co., Ltd.)

(3) Production of Laminate

On top of Film A prepared according to (1) above, a rubber composition prepared according to (2) above was extruded with a thickness of 0.7 mm to produce a laminate.

(4) Evaluation of Laminates

The following "Peel Strength Test" was conducted to evaluate the resulting laminates. The evaluation results are shown in Table 2.

[Peel Strength Test]

After vulcanization, a laminate sample was cut to a width of 25 mm, and the peel strength of the resulting strip specimen was measured according to JIS-K6256. The measured peel strength (N/25 mm) was indexed, assuming that the peel strength of Comparative Example 1 is 100.

TABLE 2

Formulations (parts by weight) and peel strength test results for rubber compositions of Comparative Examples 1 to 3 and Examples 1 to 4

|  | Comp. Ex. 1 | Comp. Ex. 2 | Comp. Ex. 3 | Ex. 1 | Ex. 2 | Ex. 3 | Ex. 4 |
|---|---|---|---|---|---|---|---|
| SBR1 | 50 |  |  | 25 |  |  |  |
| SBR2 |  | 50 |  |  | 25 |  |  |
| SBR3 |  |  | 50 |  |  | 25 |  |
| SBR4 |  |  |  | 25 | 25 | 25 | 50 |
| NR | 50 | 50 | 50 | 50 | 50 | 50 | 50 |
| Carbon black | 60 | 60 | 60 | 60 | 60 | 60 | 60 |
| Stearic acid | 1 | 1 | 1 | 1 | 1 | 1 | 1 |
| Aromatic oil | 7 | 7 | 7 | 7 | 7 | 7 | 7 |
| Zinc oxide | 3 | 3 | 3 | 3 | 3 | 3 | 3 |
| Condensate | 2 | 2 | 2 | 2 | 2 | 2 | 2 |
| Methylene donor | 4 | 4 | 4 | 4 | 4 | 4 | 4 |
| Sulfur | 2 | 2 | 2 | 2 | 2 | 2 | 2 |
| Vulcanization accelerator | 1.5 | 1.5 | 1.5 | 1.5 | 1.5 | 1.5 | 1.5 |
| Peel strength | 100 | 100 | 100 | 150 | 150 | 150 | 200 |

As indicated by the evaluation results shown in Table 2, Examples 1 to 4 exhibited an excellent peel strength as compared to Comparative Examples 1 to 3.

INDUSTRIAL APPLICABILITY

The laminate according to the present invention is useful as an inner liner material for a pneumatic tire, and can suitably be used in the production of a pneumatic tire. The pneumatic tire comprising the inner liner material for a pneumatic tire comprising the laminate according to the present invention can suitably be used as an automobile tire.

The invention claimed is:

1. A laminate for a tire comprising a film of a thermoplastic resin composition and a layer of a rubber composition laminated on the film, wherein the rubber composition comprises
   (a) at least one rubber component selected from the group consisting of natural rubber, styrene-butadiene rubber, butadiene rubber, isoprene rubber, and mixtures thereof,
   b) a condensate of a compound represented by the following formula (1):

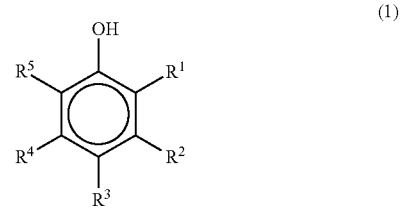

wherein $R^1$, $R^2$, $R^3$, $R^4$ and $R^5$ are independently selected from hydrogen, hydroxyl group, alkyl groups having 1 to 8 carbon atoms, —O—$R^6$, wherein $R^6$ is an alkyl group having 1 to 8 carbon atoms, and —$R^7$—O—$R^8$, wherein $R^7$ is an alkylene group having 1 to 7 carbon atoms, and $R^8$ is an alkyl group having 1 to 7 carbon atoms, with the proviso that the sum of the carbon atoms of $R^7$ and $R^8$ is 2 to 8, with formaldehyde,
   (c) at least one methylene donor, and
   (d) a vulcanizing agent,
wherein condensate (b) is present in an amount of 0.5 to 20 parts by weight per 100 parts by weight of the total amount of at least one rubber component (a),
   at least one methylene donor (c) is present in an amount of 0.25 to 200 parts by weight per 100 parts by weight of the total amount of at least one rubber component (a),
   the weight ratio of at least one methylene donor (c) and condensate (b) is 0.5:1 to 10:1, and
   at least one rubber component (a) comprises a rubber having a vinyl content in aliphatic unsaturated hydrocarbon side chains of more than 11 mol % in an amount of 10% by weight to 80% by weight based on the total amount of at least one rubber component (a),
wherein the rubber composition does not comprise an acrylonitrile-butadiene rubber.

2. The laminate according to claim 1, wherein the aliphatic unsaturated hydrocarbon side chains are vinyl groups.

3. The laminate according to claim 2, wherein the thermoplastic resin composition comprises at least one thermoplastic resin selected from the group consisting of poly(vinyl alcohol), ethylene-vinyl alcohol copolymer, nylon 6, nylon 66, nylon 11, nylon 12, nylon 610, nylon 612, nylon 6/66, nylon MXD6, and nylon 6T.

4. The laminate according to claim 2, wherein the thermoplastic resin composition comprises at least one thermoplastic resin and at least one elastomer dispersed in the thermoplastic resin, wherein the at least one thermoplastic resin is selected from the group consisting of polyvinyl alcohol, ethylene-vinyl alcohol copolymer, nylon 6, nylon 66, nylon 11, nylon 12, nylon 610, nylon 612, nylon 6/66, nylon MXD6, and nylon 6T; and the at least one elastomer is selected from the group consisting of brominated isobutylene-p-methylstyrene copolymer, maleic anhydride-modified ethylene-α-olefin copolymers, ethylene-glycidyl methacrylate copolymer, and maleic anhydride-modified ethylene-ethyl acrylate copolymer.

5. The laminate according to claim 2, wherein the at least one methylene donor is selected from the group consisting of modified etherified methylolmelamines, paraformaldehyde, hexamethylenetetramine, pentamethylenetetramine, and hexamethoxymethylmelamine.

6. An inner liner material for a pneumatic tire, consisting of the laminate according to claim 2.

7. A pneumatic tire comprising the inner liner material for a pneumatic tire consisting of the laminate according to claim 2.

8. The laminate according to claim 1, wherein the thermoplastic resin composition comprises at least one thermoplastic resin selected from the group consisting of poly(vinyl alcohol), ethylene-vinyl alcohol copolymer, nylon 6, nylon 66, nylon 11, nylon 12, nylon 610, nylon 612, nylon 6/66, nylon MXD6, and nylon 6T.

9. The laminate according to claim 8, wherein the at least one methylene donor is selected from the group consisting of modified etherified methylolmelamines, paraformaldehyde, hexamethylenetetramine, pentamethylenetetramine, and hexamethoxymethylmelamine.

10. An inner liner material for a pneumatic tire, consisting of the laminate according to claim 8.

11. A pneumatic tire comprising the inner liner material for a pneumatic tire consisting of the laminate according to claim 8.

12. The laminate according to claim 1, wherein the thermoplastic resin composition comprises at least one thermoplastic resin and at least one elastomer dispersed in the thermoplastic resin, wherein the at least one thermoplastic resin is selected from the group consisting of polyvinyl alcohol, ethylene-vinyl alcohol copolymer, nylon 6, nylon 66, nylon 11, nylon 12, nylon 610, nylon 612, nylon 6/66, nylon MXD6, and nylon 6T; and the at least one elastomer is selected from the group consisting of brominated isobutylene-p-methylstyrene copolymer, maleic anhydride-modified ethylene-α-olefin copolymers, ethylene-glycidyl methacrylate copolymer, and maleic anhydride-modified ethylene-ethyl acrylate copolymer.

13. The laminate according to claim 12, wherein the at least one methylene donor is selected from the group consisting of modified etherified methylolmelamines, paraformaldehyde, hexamethylenetetramine, pentamethylenetetramine, and hexamethoxymethylmelamine.

14. An inner liner material for a pneumatic tire, consisting of the laminate according to claim 12.

15. A pneumatic tire comprising the inner liner material for a pneumatic tire consisting of the laminate according to claim 12.

16. The laminate according to claim 1, wherein the at least one methylene donor is selected from the group consisting of modified etherified methylolmelamines, paraformaldehyde, hexamethylenetetramine, pentamethylenetetramine, and hexamethoxymethylmelamine.

17. An inner liner material for a pneumatic tire, consisting of the laminate according to claim 16.

18. A pneumatic tire comprising the inner liner material for a pneumatic tire consisting of the laminate according to claim 16.

19. An inner liner material for a pneumatic tire, consisting of the laminate according to claim 1.

20. A pneumatic tire comprising the inner liner material for a pneumatic tire consisting of the laminate according to claim 1.

* * * * *